United States Patent
Sawada

[11] Patent Number: 6,023,039
[45] Date of Patent: Feb. 8, 2000

[54] METHOD OF CLEAVING A BRITTLE MATERIAL USING A POINT HEAT SOURCE FOR PROVIDING A THERMAL STRESS

[75] Inventor: Hiroshi Sawada, Shiga, Japan

[73] Assignee: NEC Corporation, Tokyo, Japan

[21] Appl. No.: 08/960,043

[22] Filed: Oct. 29, 1997

[30] Foreign Application Priority Data

Oct. 30, 1996 [JP] Japan ................................. 8-288096

[51] Int. Cl.$^7$ .............................................. B23K 26/00
[52] U.S. Cl. ........................... 219/121.61; 219/121.72; 219/121.85; 225/1; 225/93.5
[58] Field of Search .................... 225/1, 2, 93.5; 219/121.61, 121.72, 121.85

[56] References Cited

U.S. PATENT DOCUMENTS

| | | | |
|---|---|---|---|
| 3,453,097 | 7/1969 | Hafner | 65/112 |
| 3,629,545 | 12/1971 | Graham | 219/121 L |
| 3,790,362 | 2/1974 | Dahlberg et al. | 65/174 |
| 3,935,419 | 1/1976 | Lambert et al. | 219/121 LM |
| 4,615,765 | 10/1986 | Levinson et al. | 156/643 |
| 5,084,604 | 1/1992 | Dekker et al. | 219/121.72 |
| 5,138,131 | 8/1992 | Nishikawa et al. | 219/121.67 |
| 5,154,334 | 10/1992 | Dekker et al. | 225/2 |
| 5,254,833 | 10/1993 | Okiyama | 219/121.68 |
| 5,585,018 | 12/1996 | Kanaoka et al. | 219/121.72 |
| 5,609,284 | 3/1997 | Kondratenko | 225/1 |
| 5,776,220 | 7/1998 | Allaire et al. | 65/112 |

FOREIGN PATENT DOCUMENTS

| | | |
|---|---|---|
| 3-13040 | 2/1991 | Japan . |
| WO 93/12905 | 7/1993 | WIPO . |
| WO 93/20015 | 10/1993 | WIPO . |

*Primary Examiner*—Rinaldi I. Rada
*Assistant Examiner*—Stephen Choi
*Attorney, Agent, or Firm*—Young & Thompson

[57] ABSTRACT

A method of cleaving a strip by tensile stress applied by a pulse laser point heat source by shifting a pulse-heating position of the pulse laser point heat source on the basis of both an optimum distance "D" of a center position of a pulse beam spot of the pulse laser point heat source irradiated on the strip from a tip of a crack of the strip and an optimum pulse time "t" of the pulse laser point heat source, wherein the optimum distance "D" is determined by the steps of: selecting "t" to find a value of $4\kappa t/W^2$ where "$\kappa$" is a thermal diffusivity of the strip, "W" is a width defined as a distance between a cleaving-intended line and a side edge of the strip; and finding an optimum value of D/W from the value of $4\kappa t/W^2$ with reference to a previously obtained relationship between the optimum value of D/W and the value of $4\kappa t/W^2$ thereby to find the optimum distance "D". The optimum distance "D" is found so that if the value of $4\kappa t/W^2$ is in the range of 0.0001–0.05, then the optimum value of D/W is 0.1, if the value of $4\kappa t/W^2$ is in the range of 0.05–1.0, then the optimum value of D/W is 0.2, and if the value of $4\kappa t/W^2$ is not less than 1.0, then the optimum value of D/W is 0.4.

11 Claims, 10 Drawing Sheets

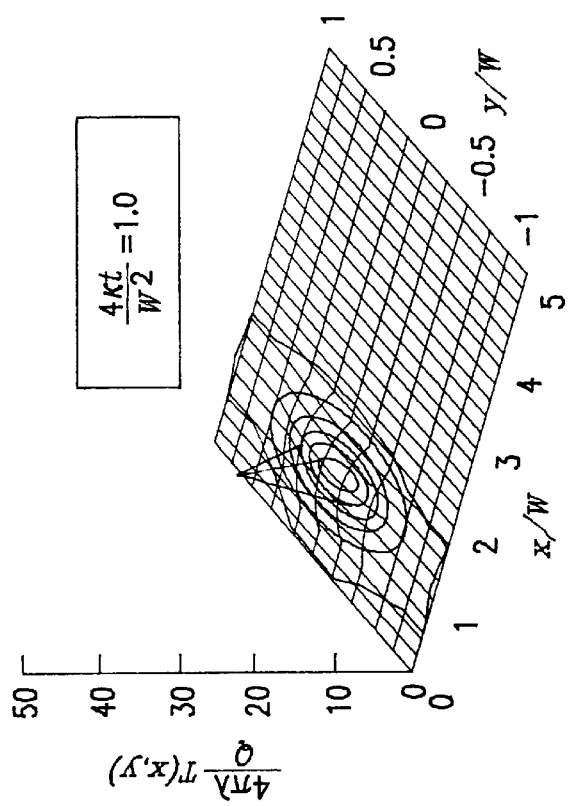
FIG. 8A1
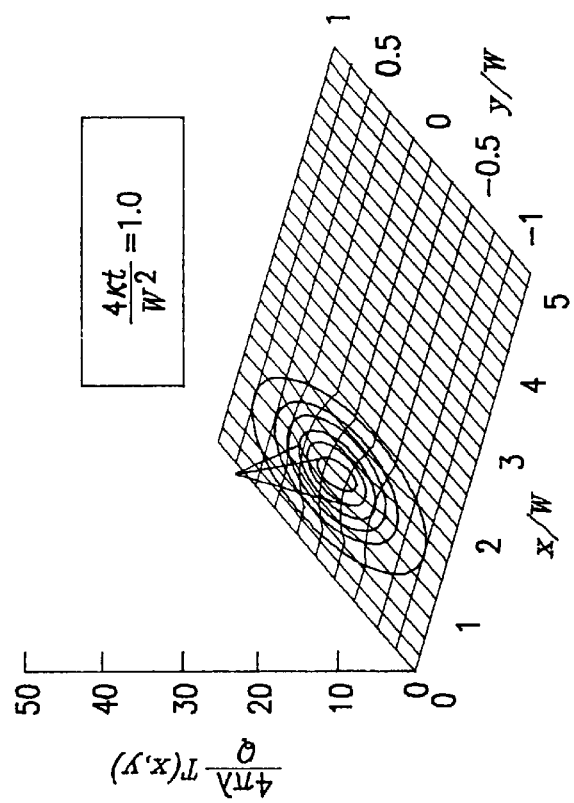
FIG. 8A2

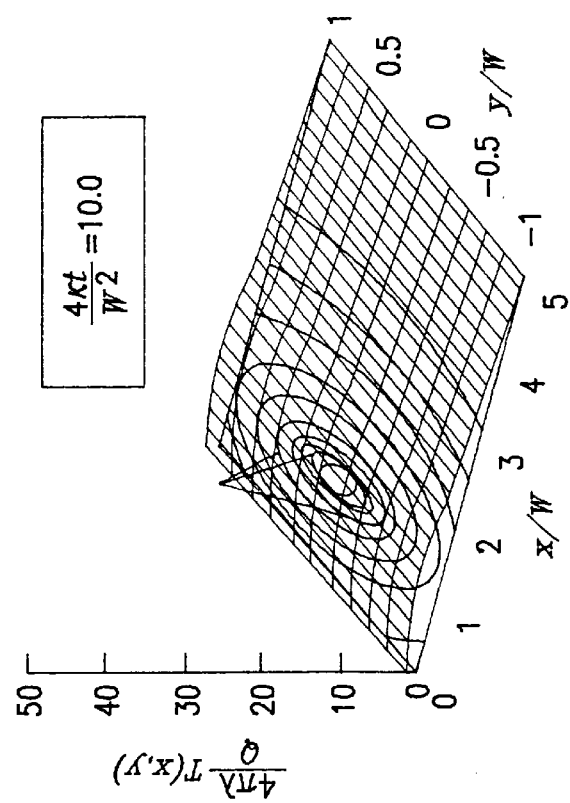
FIG. 8B2
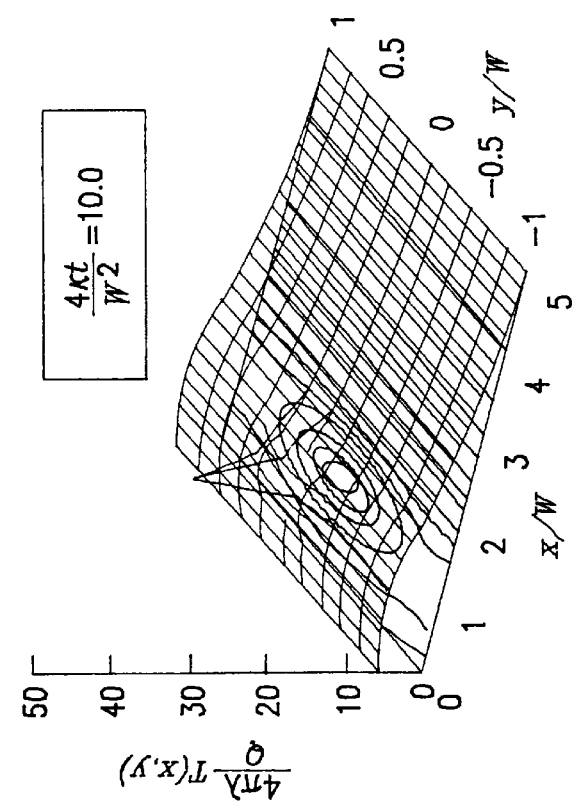
FIG. 8B1

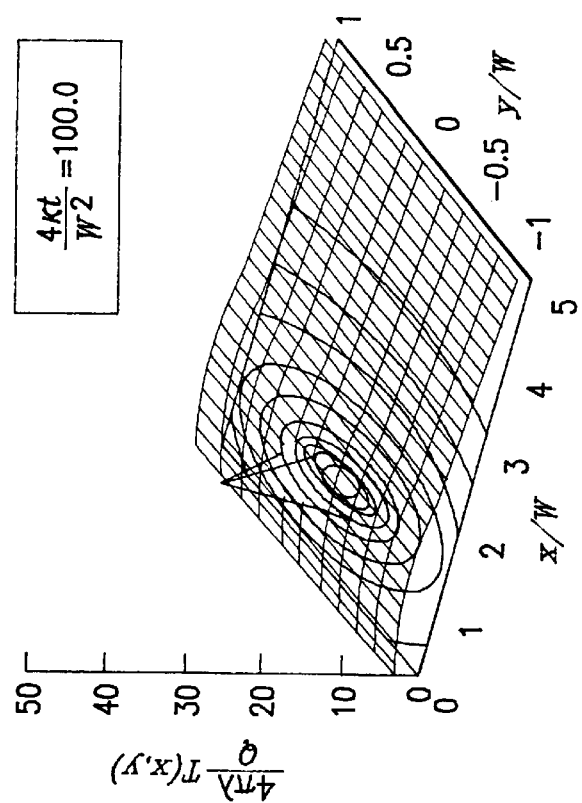
FIG. 8C2
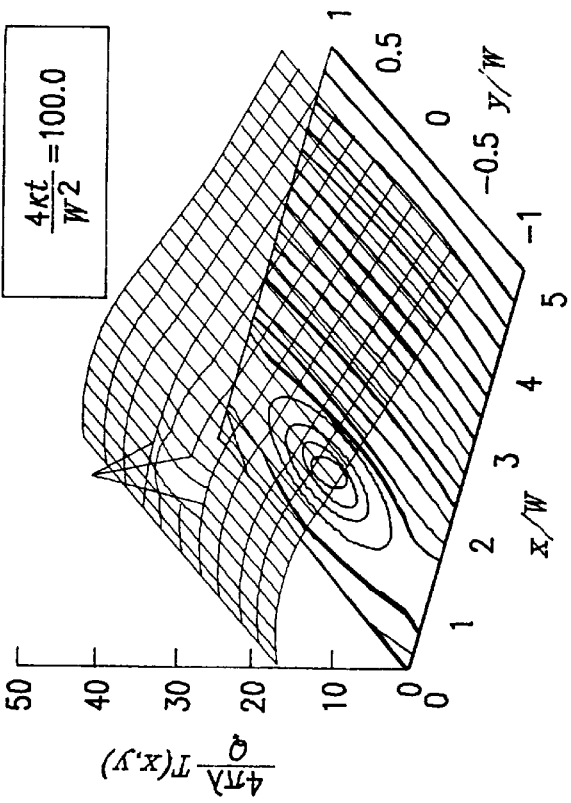
FIG. 8C1

METHOD OF CLEAVING A BRITTLE MATERIAL USING A POINT HEAT SOURCE FOR PROVIDING A THERMAL STRESS

BACKGROUND OF THE INVENTION

The present invention relates to a method of cleaving a brittle material using a point heat source which is capable of providing a thermal stress to the brittle material.

A conventional method for cleaving brittle materials such as semiconductor wafer, ceramics and glass by use of a heat source is disclosed in Japanese patent publication No. 3-13040. This conventional cleaving method will be described in detail with reference to FIGS. 1, 2 and 3. The brittle material is intended to be cleaved along a cleaving line 3. A recess 2 has been formed at a cleaving starting point which is defined as a crossing point of the cleaving line 3 and a side edge of the brittle material. A heat source 4 applies a heat locally at a point which is positioned on the cleaving line and in the vicinity of the recess 2 so that a tensile stress is generated in a direction along tangential lines of virtual isothermal lines 5. For this reason, the tensile stress causes a crack 6. The crack 6 propagates from a tip of the recess 2 toward the point of the heat source 4. As illustrated in FIG. 3, temperature distribution lines indicate that the temperature of the brittle material has a peak on the point of the heat source 4. Stress distribution lines indicate that a compressive stress appears on the point of the heat source 4, whilst the tensile stress appears around the point of the heat source 4. For this reason, a tip of the crack 6 propagates from the recess 2 toward the point of the heat source 4 so that the crack 6 extends to a position which is close to but distanced from the point of the heat source 4. The crack 6, however, does not reach the point of the heat source 4 because no tensile stress appears on the point of the heat source 4. As illustrated in FIG. 2, the point of the heat source 4 is moved along the cleaving line 3 so that the stress distribution lines move along the movement of the point of the heat source 4. As a result, the compressive stress and the tensile stress move along the movement of the point of the heat source 4. For this reason, the tip of the crack 6 further propagates along the cleaving line 3 toward the moved point of the heat source 4. The point of the heat source 4 moves from A, B to C sequentially, so that the tip of the crack 6 moves from P, P1 to P2. It can be understood that the locus of the movement of the point of the heat source 4 is different from the cleaving line 6 because the tip of the crack 6 propagates toward the point of the heat source 4.

In the above conventional cleaving method, the point of the heat source 4 is found by trial-and-error method, wherein a distance between the tip of the crack 6 and the point of the heat source 4 as well as a heating time are varied to determine an optimum heating point and an optimum heating time for effectively and efficiently adding the tensile stress to crack of the brittle material strip. The optimum heating point and the optimum heating time depend upon the material of the brittle strip and the width thereof. This means that the optimum distance between the tip of the crack 6 and the point of the heat source 4 as well as the optimum heating time depend upon the material of the brittle strip and the width thereof, for which reason the optimum distance between the tip of the crack 6 and the point of the heat source 4 as well as the optimum heating time are required to be found for every different material of the brittle strip and the different widths thereof. Even if the distance between the tip of the crack 6 and the point of the heat source 4 as well as the heating time are determined by the trial-and-error method, then those distance and heating time might be slightly different from the actual optimum distance and heating time. The conventional cleaving work is time-consuming procedure. This makes it difficult to realize automation of the laser beam machining.

In the above circumstances, it had been required to develop a novel method of cleaving a strip of brittle material free from the above problems.

SUMMARY OF THE INVENTION

Accordingly, it is an object of the present invention to provide a novel method of cleaving a strip of brittle material free from the above problems.

It is a further object of the present invention to provide a novel method of cleaving a strip of brittle material which enables automation of laser beam machining.

It is a still further object of the present invention to provide a novel method of cleaving a strip of brittle material which shortens the necessary time for finding the optimum distance between a tip of a crack and a point of a heat source as well as the optimum heating time.

It is yet a further object of the present invention to provide a novel method of cleaving a strip of brittle material which shortens the necessary cleaving time.

The above and other objects, features and advantages of the present invention will be apparent from the following descriptions.

The present invention provides a method of cleaving a strip by tensile stress applied by a pulse laser point heat source by shifting a pulse-heating position of the pulse laser point heat source on the basis of both an optimum distance "D" of a center position of a pulse beam spot of the pulse laser point heat source irradiated on the strip from a tip of a crack of the strip and an optimum pulse time "t" of the pulse laser point heat source, wherein the optimum distance "D" and the optimum pulse time "t" are determined by the steps of: pre-determining "t" to find a value of $4\kappa t/W^2$ where "$\kappa$" is a thermal diffusivity of the strip, "W" is a width defined as a distance between a cleaving-intended line and a side edge of the strip; and finding an optimum value of D/W from the value of $4\kappa t/W^2$ with reference to a previously obtained relationship between the optimum value of D/W and the value of $4\kappa t/W^2$ thereby to find the optimum distance "D". The optimum distance "D" is found so that if the value of $4\kappa t/W^2$ is in the range of 0.0001–0.05, then the optimum value of D/W is 0.1, if the value of $4\kappa t/W^2$ is in the range of 0.05–1.0, then the optimum value of D/W is 0.2, and if the value of $4\kappa t/W^2$ is not less than 1.0, then the optimum value of D/W is 0.4.

BRIEF DESCRIPTIONS OF THE DRAWINGS

Disclosure of the present invention will be made in detail with reference to the accompanying drawings.

Figure 1:
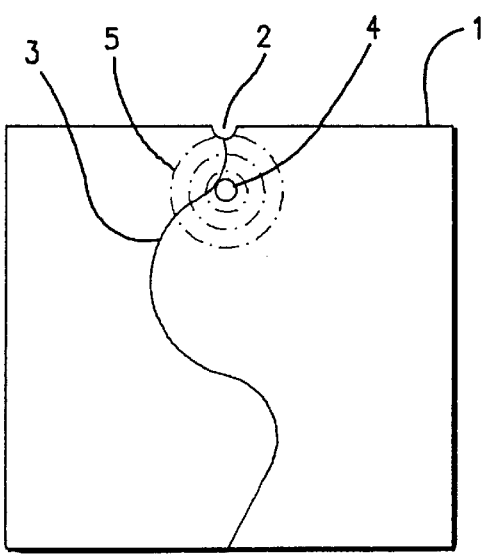
FIG. 1 is a plane view illustrative of the conventional method of cleaving a brittle plate.
Figure 2:
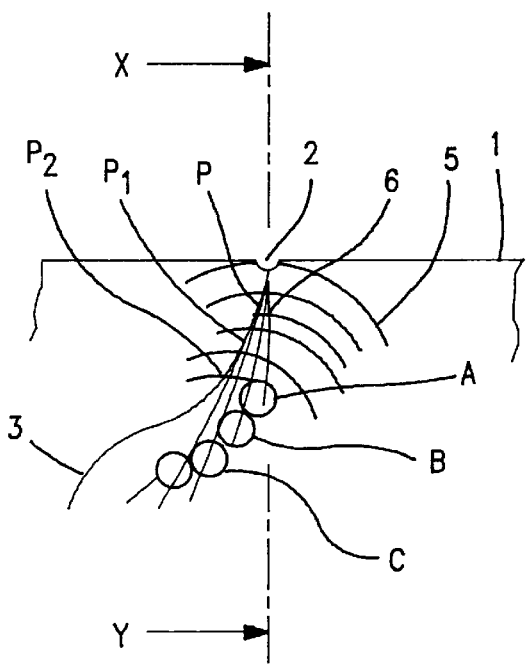
FIG. 2 is an enlarged plane view illustrative of crack propagation mechanism in the conventional cleaving method.
Figure 3:
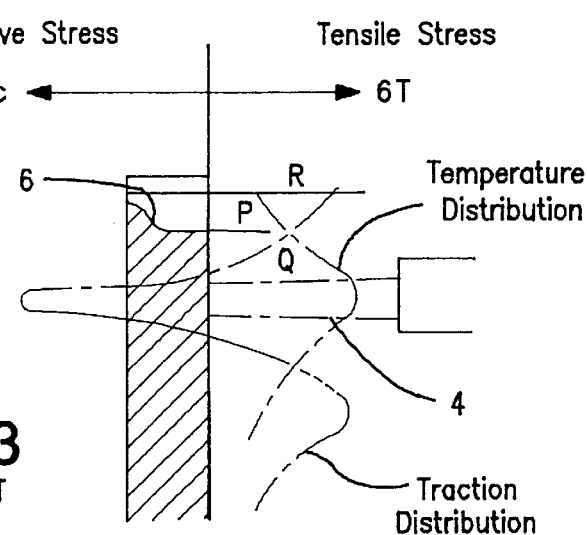
FIG. 3 is a temperature distribution and compressive and tensile stresses in the conventional cleaving method.

FIGS. 8A1 and 8A2 are views illustrative of comparisons of temperature distribution in the strip (FIG. 8A1) and in an infinite plate (FIG. 8A2) at $4\kappa t/W^2=1.0$.

FIGS. 8B1 and 8B2 are views illustrative of comparisons of temperature distribution in the strip (FIG. 8B1) and in an infinite plate (FIG. 8B2) at $4\kappa t/W^2=10.0$.

FIGS. 8C1 and 8C2 are views illustrative of comparisons of temperature distribution in the strip (FIG. 8C1) and in an infinite plate (FIG. 8C2) at $4\kappa t/W^2=100.0$.

Figure 9A:
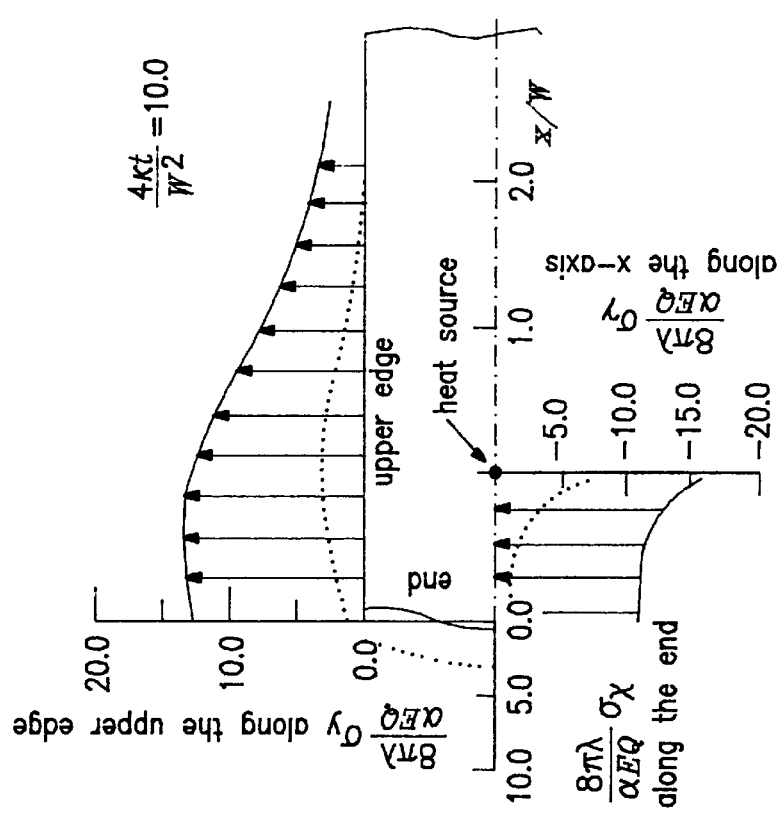
Figure 9B:
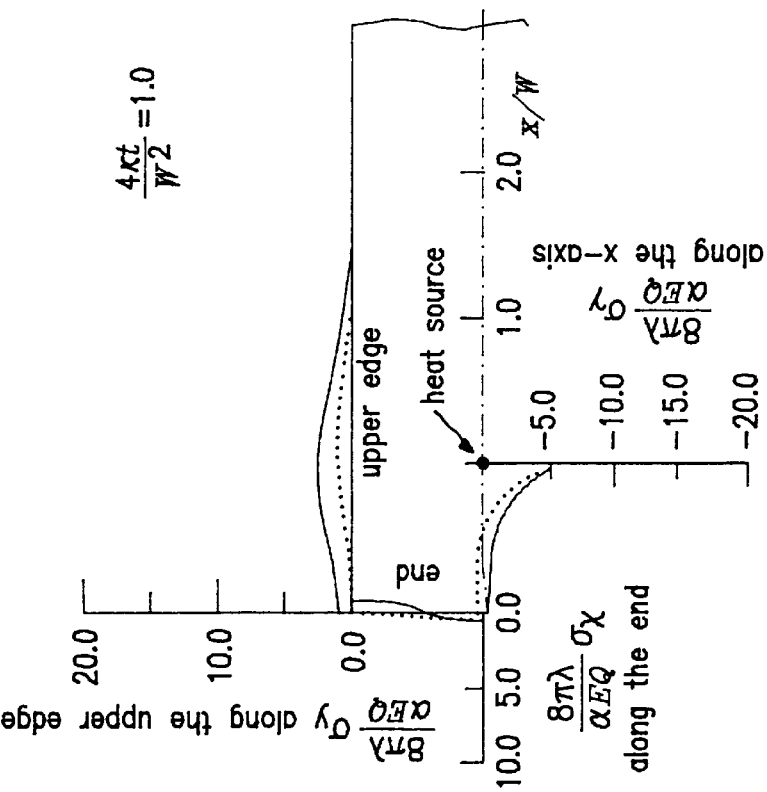
Figure 10B:
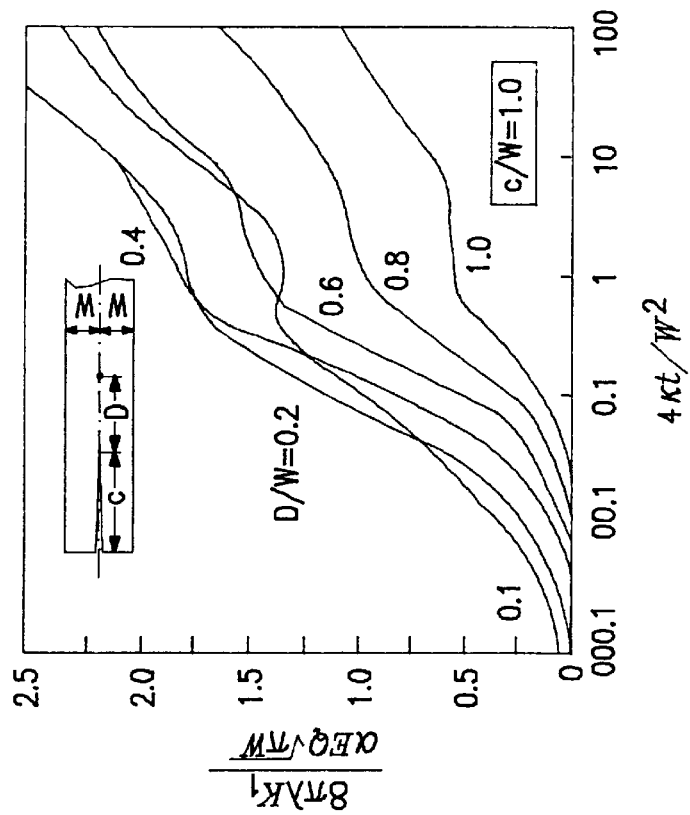
Figure 10A:
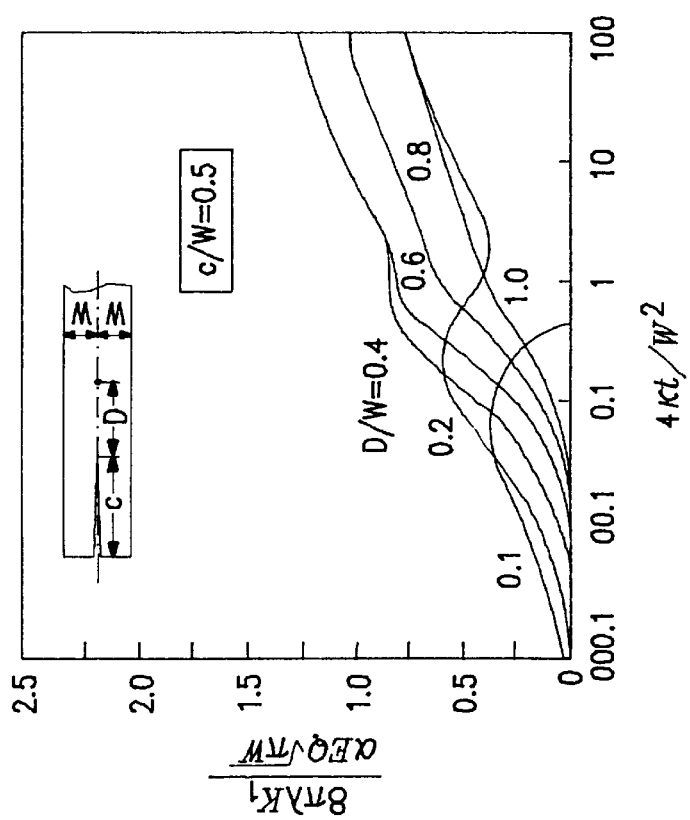
Figure 10D:
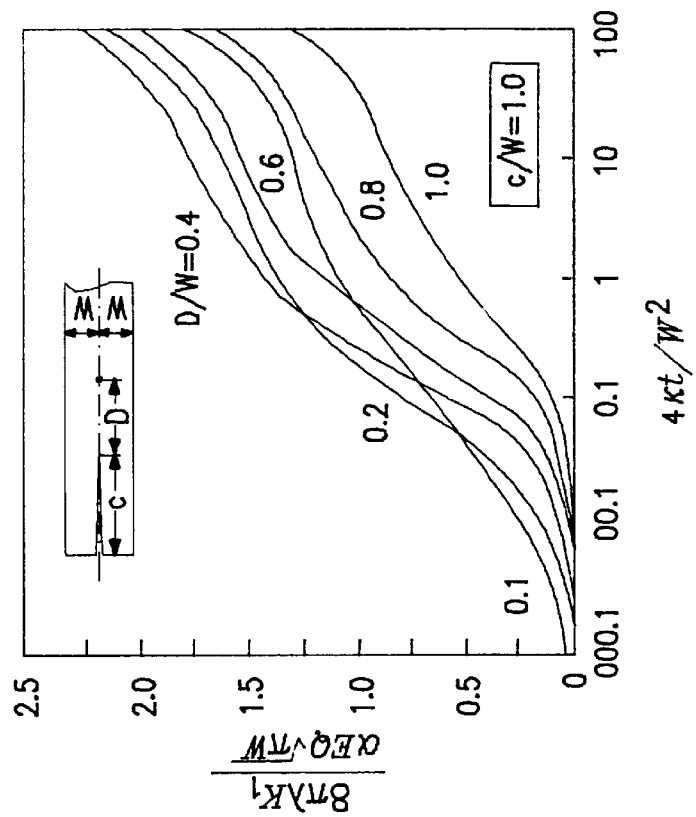
Figure 10C:
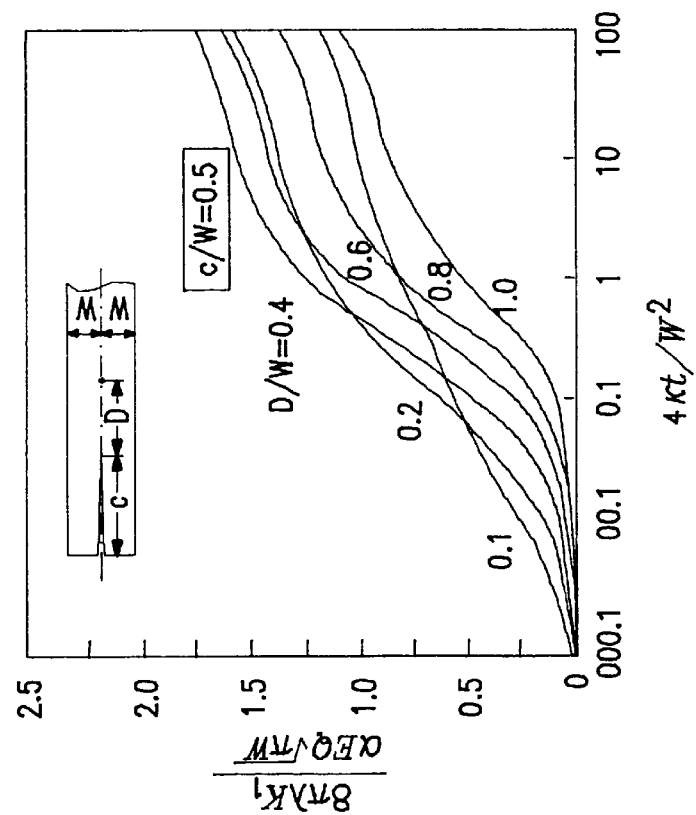

FIGS. 9A and 9B are views illustrative of distribution of traction along boundaries to be superposed onto the thermal stress field due to point heat source.

FIGS. 10A–10D are graphs illustrative of time-dependent variations of the thermal stress intensity factor at the tip of the edge crack.

Figure 11B:
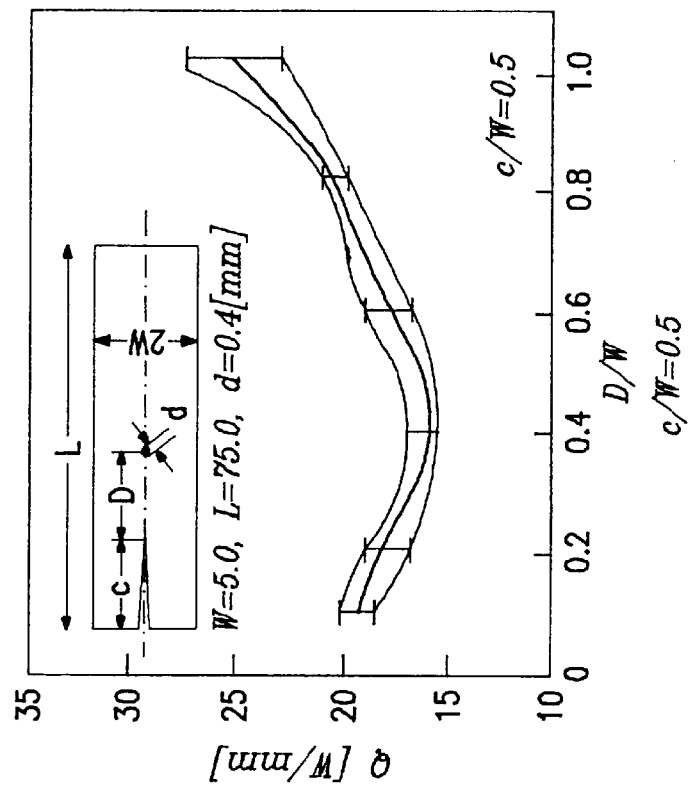
Figure 11A:
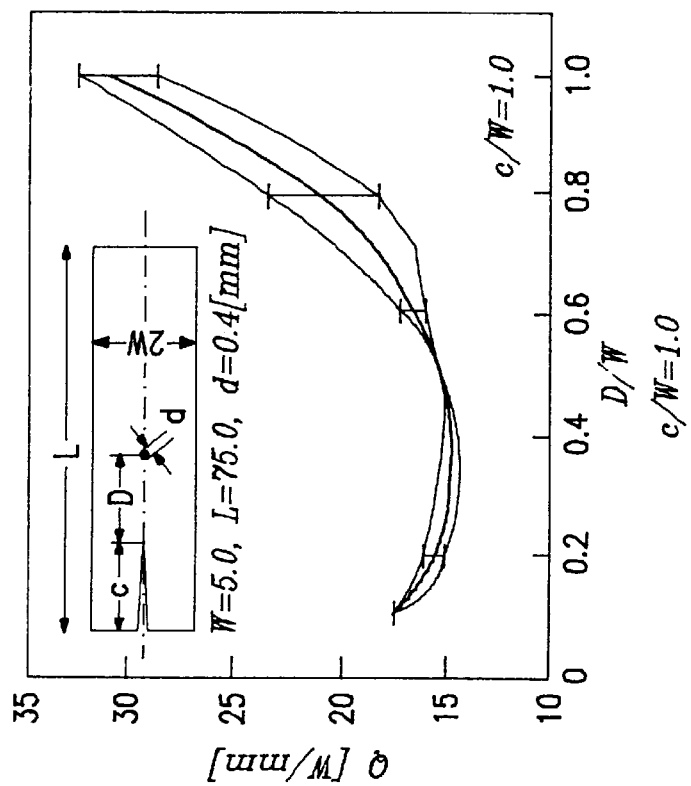

FIGS. 11A–11B are views illustrative of the experimental results of silicon plate cleaving.

DISCSLOSURE OF THE INVENTION

The present invention provides a method of determining both an optimum distance "D" of a center position of a beam spot of a pulse laser point heat source irradiated on a strip from a tip of a crack of the strip and an optimum pulse time "t" of the pulse laser point heat source for the purpose of cleaving the strip by tensile stress applied by the pulse laser point heat source, wherein the method comprises the steps of: selecting "t" to find a value of $4\kappa t/W^2$ where "κ" is a thermal diffusivity of the strip, "W" is a width defined as a distance between a cleaving-intended line and a side edge of the strip; and finding an optimum value of D/W from the value of $4\kappa t/W^2$ with reference to a previously obtained relationship between the optimum value of D/W and the value of $4\kappa t/W^2$ thereby to find the optimum distance "D". The optimum distance "D" is found so that if the value of $4\kappa t/W^2$ is in the range of 0.0001–0.05, then the optimum value of D/W is 0.1, if the value of $4\kappa t/W^2$ is in the range of 0.05–1.0, then the optimum value of D/W is 0.2, and if the value of $4\kappa t/W^2$ is not less than 1.0, then the optimum value of D/W is 0.4.

The present invention also provides a method of cleaving a strip by tensile stress applied by a pulse laser point heat source by shifting a pulse-heating position of the pulse laser point heat source on the basis of both an optimum distance "D" of a center position of a pulse beam spot of the pulse laser point heat source irradiated on the strip from a tip of a crack of the strip and an optimum pulse time "t" of the pulse laser point heat source, wherein the optimum distance "D" and the optimum pulse time "t" are determined by the steps of: selecting "t" to find a value of $4\kappa t/W^2$ where "κ" is a thermal diffusivity of the strip, "W" is a width defined as a distance between a cleaving-intended line and a side edge of the strip; and finding an optimum value of D/W from the value of $4\kappa t/W^2$ with reference to a previously obtained relationship between the optimum value of D/W and the value of $4\kappa t/W^2$ thereby to find the optimum distance "D". The optimum distance "D" is found so that if the value of $4\kappa t/W^2$ is in the range of 0.0001–0.05, then the optimum value of D/W is 0.1, if the value of $4\kappa t/W^2$ is in the range of 0.05–1.0, then the optimum value of D/W is 0.2, and if the value of $4\kappa t/W^2$ is not less than 1.0, then the optimum value of D/W is 0.4.

Figure 4:
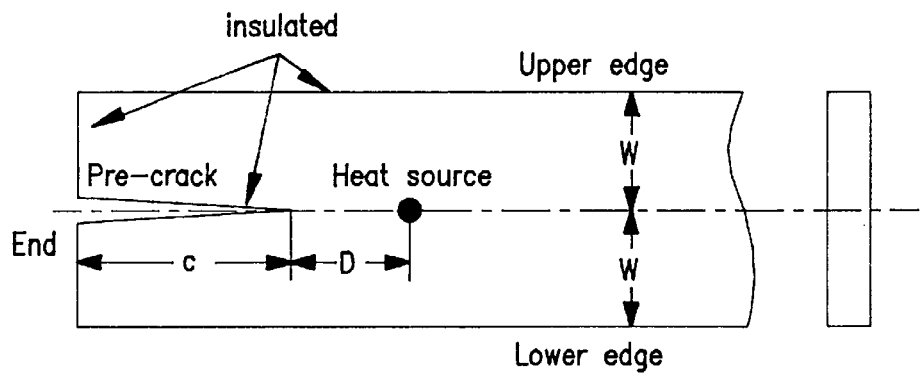
FIG. 4 is a plane view illustrative of cleaving of a semi-infinite strip using a point heat source.
Figure 5:
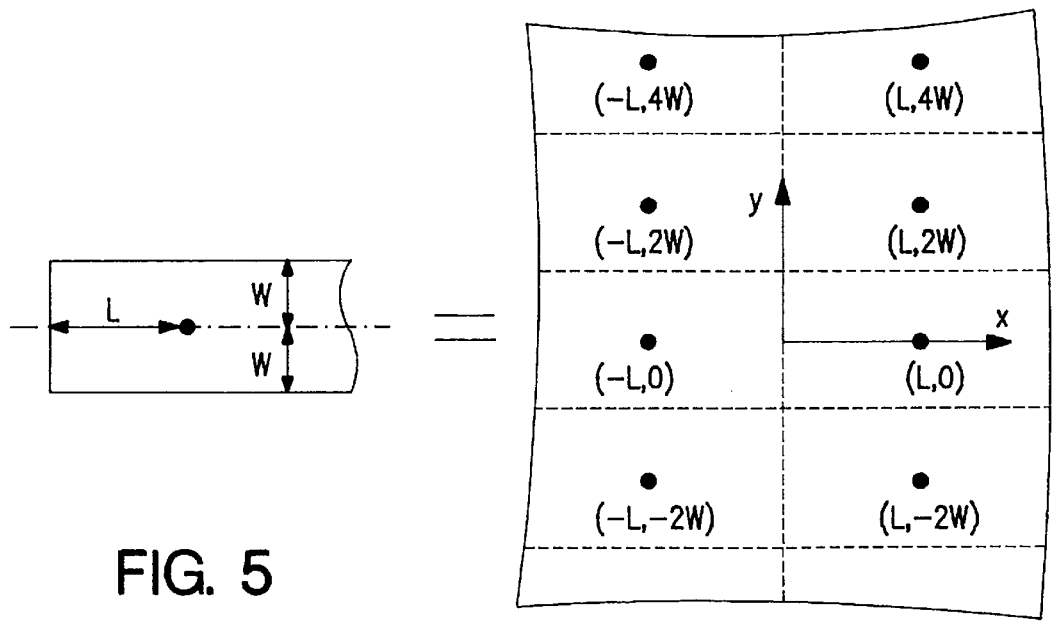
FIG. 5 is a view illustrative of a method of analysis of temperature field in the strip.

With reference to FIG. 4, the description will be made for division of a semi-infinite strip using a continual point heat source. An axisymmetric temperature distribution $T^0(r,t)$ and a resultant thermal stress field $\sigma_r(r,t)$ due to a continual point heat source applied to a thin infinite elastic plate may be expressed as follows.

$$T^0(r, t) = \frac{Q}{4\pi\lambda} \int_0^t \frac{\exp\{-r^2/4\kappa(t-\tau)\}}{t-\tau} d\tau \qquad (1)$$

$$\sigma_r(r, t) = -\alpha E \cdot \frac{1}{r^2} \int_0^r T^0(r, t) r dr \qquad (2)$$

where r is a distance from the point heat source, t is a heating time, Q is a magnitude of the heat source per unit time and per unit thickness, λ is a thermal conductivity, E is a modules of elasticity, κ is a thermal diffusivity, α is a liner expansion coefficient. If the plate thickness is sufficiently thin, then the temperature in the direction of plate thickness may be regarded to be uniform so that the resultant thermal stress field would be in the ideal plane stress state. The upper and lower edges of the end of the strip are assumed to be thermally insulated. In order to obtain the temperature field of the strip, the above equation (1) may be superposed periodically as shown in FIG. 5. Thermally insulated boundaries may be expressed by a broken line due to the symmetry.

The thermoelastic field due to the infinitely periodic heat sources as shown in FIG. 5 may be obtained simply by superposing the thermoelastic field due to the point heat source acting at (±L, ±2nW), (n=1,2, . . . ). The final expression for the field may be written in a certain coordinate system as follows.

$$T(x, y, t) = \frac{Q}{4\pi\lambda} \sum_{i=1}^{2} \left[ \sum_{n=-\infty}^{\infty} E_1\left(\frac{r_{i,n}^2}{4\kappa t}\right) \right] \qquad (4)$$

$$\sigma_x(x, y, t) = \qquad (5)$$
$$-\frac{\alpha E Q}{8\pi\lambda} \sum_{i=1}^{2} \left[ \sum_{n=-\infty}^{\infty} \left\{ E_1\left(\frac{r_{i,n}^2}{4\kappa t}\right) - \left(1 - e^{-\frac{r_{i,n}^2}{4\kappa t}}\right) \cdot \left(1 - 2\frac{X_i^2}{r_{i,n}^2}\right) \cdot \frac{4\kappa t}{r_{i,n}^2} \right\} \right]$$

$$\sigma_y(x, y, t) = \qquad (6)$$
$$-\frac{\alpha E Q}{8\pi\lambda} \sum_{i=1}^{2} \left[ \sum_{n=-\infty}^{\infty} \left\{ E_1\left(\frac{r_{i,n}^2}{4\kappa t}\right) + \left(1 - e^{-\frac{r_{i,n}^2}{4\kappa t}}\right) \cdot \left(1 - 2\frac{X_i^2}{r_{i,n}^2}\right) \cdot \frac{4\kappa t}{r_{i,n}^2} \right\} \right]$$

$$\tau_{xy}(x, y, t) = -\frac{\alpha E Q}{8\pi\lambda} \sum_{i=1}^{2} \left[ \sum_{n=-\infty}^{\infty} \frac{8\kappa t X_i Y_n}{r_{i,n}^4}\left(1 - e^{-\frac{r_{i,n}^2}{4\kappa t}}\right) \right] \qquad (7)$$

Where $X_1=(x-L), X_2=(x+L)$, $Y_n=y-2nW$, and $r^2_{i,n}=X+Y$. $E_l(u)$ is the integral exponential function defined as $$E_l(u) = \int_u^\infty \frac{e^{-x}}{x} dx \qquad (8)$$

It should be noted that the effect of heat dissipation from the plate surface was omitted simply because this analysis is concerned only with the thermoelastic phenomenon in the beginning of the heating, and a heating time t is restricted to be considerably short. For the large value of u, El(u) is rapidly converged, for which reason the sum up to ±∞ about n can be approximated to be the sum up to some finite number N. The remaining term involved in the equations (5) and (6) can be calculated using the following formula.

$$\sum_{n=-\infty}^{\infty}\left(1-2\frac{X_i^2}{r_{i,n}^2}\right)\cdot\frac{4\kappa t}{r_{i,n}^2} = \frac{\pi^2}{2}\cdot\frac{4\kappa t}{W^2}\left[\frac{1-\cosh\pi\frac{X_i}{W}\cdot\cos\pi\frac{y}{W}}{\left(\cosh\pi\frac{X_i}{W}-\cos\pi\frac{y}{W}\right)^2}\right] \quad (9)$$

where it is assumed that the crack opening displacement induced by the infinite arrays of point heat source is considerably small and thus the temperature field remains unchanged even if the crack opens.

Figure 6:
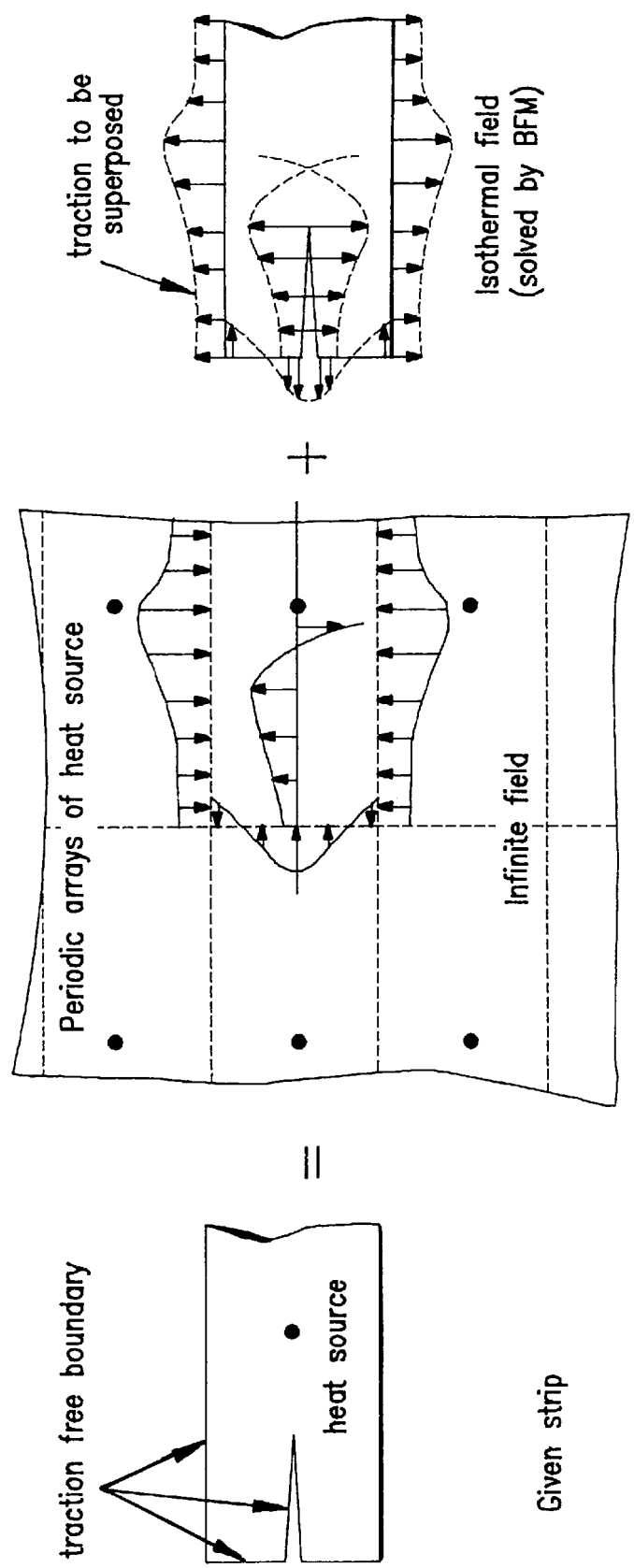
FIG. 6 is a view illustrative of superposition of stress fields.

The thermal stress field due to the infinite arrays of heat source does not satisfy the stress boundary condition. In order to remove the stresses along the boundary, isothermal elastic field must be superposed as shown in FIG. 6. Stress intensity factor is calculated in the isothermal field whose stress boundary value is obtained from the condition that the traction along the boundary after superposition should be zero. In order to solve the isothermal problem, the body force method for two dimensional elastic problem was used. The body force method is one of the boundary type numerical technique for analysis of the stress, which was proposed by H. Nisitani. The body force method seems to be the optimum numerical method for analysis of the crack. Moreover, a highly accurate solution is easily obtainable. In the body force method, the boundary of the body is approximated by several boundary elements in the same manner as in usual boundary element methods. The boundary discretization for the body force method is shown in FIG. 7, where the linear element was used for the upper elements extend to 15 W and one semi-infinite boundary element for the remnant part.

FIGS. 8A1 through 8C2 show the differences between the temperature distribution in the semi-infinite strip and in the same area of the infinite plate due to an isolated point heat source applied at x/W=1.0, y/W=0.0. In the beginning of heating (4κt/W²=1.0), the temperature distributions are almost the same between two cases. The contour appears as the concentric cycle with the origin at the heating point. As the heating time increases, the difference between the two becomes large. The axisymmetric distribution holds in an infinite plate independently from the heating time. Notwithstanding, this characteristic of the axisymmetric distributions is not conserved in the semi-infinite strip. A remarkable rise in temperature appears near the end (x/W= 0).

FIGS. 9A and 9B show the traction distributions along the boundary to be superposed to the thermal stress field due to the point heat source, where the normal stresses for the strip expressed by real line is compared with one in the infinite plate expressed by dotted lines at the corresponding position. The difference in traction is small in the beginning of heating (4κt/W²=1.0), but this difference becomes large as the heating time increases. It can be understood that the normal stress along the upper edge is tensile whilst the stress on the x-axis is compressive with the singularity at the heating point. From FIGS. 9A and 9B, it is predictable that time-dependent variation of the thermal stress intensity factor appears at the tip of the edge crack in the strip. Further, if the resulting stress intensity factor has once reached fracture toughness of the material, then the crack propagates toward the heat source until the resulting stress intensity factor reaches a certain point leaving a small distance from the heat source.

Figure 7:
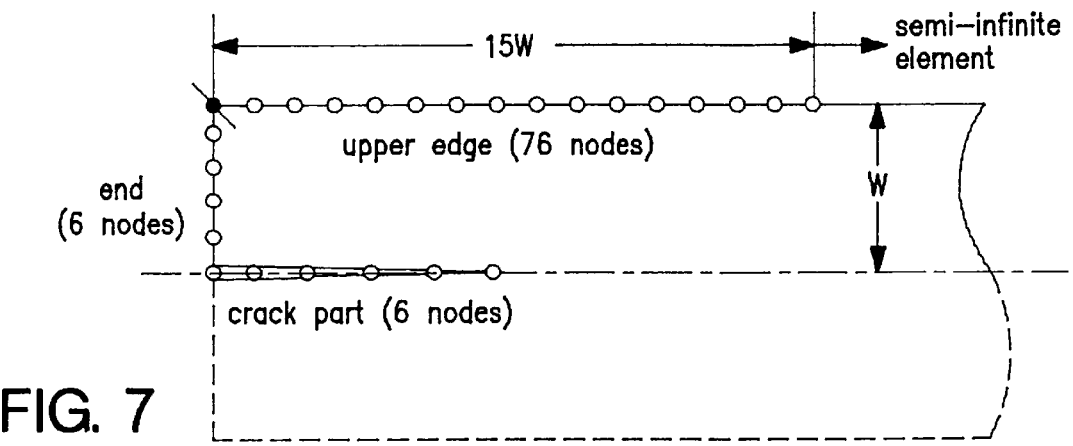
FIG. 7 is a plane view illustrative of discretization of the boundaries for analysis in the body force method.

FIG. 7 shows the time-dependent variations in the thermal stress intensity factor of the tip of the edge crack. If the non-dimensional heating time $4\kappa t/W^2$ is greater than 0.5, then the most effective heating position is approximately D/W=0.4. This relationship remains applicable even if the crack length would widely be changed within a range of 0.5<c/W<10.0. The crack length dependency of the relationship between the stress intensity factor and $4\kappa t/W^2$ decreases for c/W>5.0.

The calculation method of the stress intensity factor for the edge crack in the semi-infinite strip due to the thermal stress of the point heat source has been shown and the calculations were made under various geometric and heating time conditions. It has been found that the most effective heating location is the point ahead of the crack tip for approximately 0.4 times the half strip width regardless of the crack length. The heating point is shifted so that the above relationship is satisfied for realizing the most effective cleaving. This facilitates automation of the laser processing device. If the time interval of the laser pulses is too short, then it is difficult to obtain the necessary temperature gradient of the strip due to residual heat applied by the previous laser pulse whereby a small or insufficient thermal stress can be obtained by the next laser pulse. To avoid this problem, it is preferable to set the time interval of the laser pulses at least 5 milliseconds for obtaining a sufficient heat radiation effect.

In order to verify the present analysis, cleaving test of silicon strip using a Nd:YAG laser as the heat source was carried out.

The following Table 1 shows the thermo-mechanical properties of the used material.

TABLE 1

| κ [m²/s] | α [1/K] | λ [W/mK] | E [GPa] |
|---|---|---|---|
| 83 × 10⁻⁶ | 2.62 × 10⁻⁶ | 156 | 117 |

Thermo-mechanical properties of silicon at room temperature.

The thickness of the plate was 0.36 millimeters and the width thereof was 10.0 millimeters. The diameter of the laser spot was set to be 0.4 millimeters. The heating time was fixed to be 0.3 seconds. The minimum amount of laser output required for crack extension was measured by increasing the output step by step up to 30 W. The results of the cleaving test are shown in FIGS. 11A and 11B. The absorbed amount of laser output for the crack extension, Q were plotted to the heating location D/W with error bars. The broad line represents the mean values of the experimental data. It can been understood that the most effective heating location for the thermal stress cleaving would be D/W ~0.4 in both cases for the crack length ratio c/W=1.0 and 5.0. This results agree with the numerical results at $4\kappa t/W^2=4.0$ shown in FIGS. 10A–10D.

The same experimental results were obtained for other compound semiconductors such as GaAs, InP.

Further, while the above description relates to a determination of an optimum value of "D" based on a given value for "t", conversely an optimum value of "t" may be similarly determined based on a given value for "D".

Whereas modifications of the present invention will be apparent to a person having ordinary skill in the art, to which the invention pertains, it is to be understood that embodiments as shown and described by way of illustrations are by no means intended to be considered in a limiting sense. Accordingly, it is to be intended to cover by claims all modifications which fall within the spirit and scope of the present invention.

What is claimed is:

1. A method of determining an optimum distance "D" of a center position of a beam spot of a pulse laser point heat source irradiated on a strip from a tip of a crack of said strip, said pulse laser point heat source having a pulse time "t", for the purpose of cleaving said strip by tensile stress applied by said pulse laser point heat source, wherein said method comprises the steps of:

selecting "t" to find a value of $4\kappa t/W^2$ where "$\kappa$" is a thermal diffusivity of said strip, "W" is a width defined as a distance between a cleaving-intended line and a side edge of said strip; and finding an optimum value of D/W from said value of $4\kappa t/W^2$ with reference to a previously obtained relationship between said optimum value of D/W and said value of $4\kappa t/W^2$ thereby to find said optimum distance "D".

2. The method as claimed in claim 1, wherein said optimum distance "D" is found so that if said value of $4\kappa t/W^2$ is in the range of 0.0001–0.05, then said optimum value of D/W is 0.1, if said value of $4\kappa t/W^2$ is in the range of 0.05–1.0, then said optimum value of D/W is 0.2, and if said value of $4\kappa t/W^2$ is not less than 1.0, then said optimum value of D/W is 0.4.

3. The method as claimed in claim 1, wherein "t" is selected to cool said strip between pulses of said pulse laser point heat source to cause a sufficient temperature gradient in order to apply a sufficiently high tensile stress for cleaving said strip.

4. The method as claimed in claim 3, wherein said time interval is not less than 5 milliseconds.

5. The method as claimed in claim 1, wherein said strip is made of a brittle material.

6. The method as claimed in claim 5, wherein said strip is a semiconductor chip.

7. A method of determining an optimum value of pulse time "t" of a pulse laser point heat source irradiated on a strip based on a distance "D" of a center position of a beam spot of said pulse laser point heat source from a tip of a crack of said strip for the purpose of cleaving said strip by tensile stress applied by said pulse laser point heat source, wherein said method comprises the steps of:

selecting "D" to find a value of D/W, where "W" is a width defined as a distance between a cleaving-intended line and a side edge of said strip; and finding an optimum value of $4\kappa t/W^2$ from said value of D/W with reference to a previously obtained relationship between said value of D/W and said value of $4\kappa t/W^2$ thereby to find said optimum pulse time "t" where "$\kappa$" is a thermal diffusivity of said strip.

8. The method as claimed in claim 7, wherein "t" is selected to cool said strip between pulses of said pulse laser point heat source to cause a sufficient temperature gradient in order to apply a sufficiently high tensile stress for cleaving said strip.

9. The method as claimed in claim 8, wherein t is not less than 5 milliseconds.

10. The method as claimed in claim 7, wherein said strip is made of a brittle material.

11. The method as claimed in claim 10, wherein said strip is a semiconductor chip.

* * * * *